United States Patent [19]

Kakukawa et al.

[11] 4,160,159
[45] Jul. 3, 1979

[54] AUTOMATIC FOCUSSING APPARATUS

[75] Inventors: Masatoshi Kakukawa; Hideyuki Kondo, both of Suwa, Japan

[73] Assignee: Sankyo Kogaku Kogyo Kabushiki Kaisha, Japan

[21] Appl. No.: 856,038

[22] Filed: Nov. 30, 1977

[51] Int. Cl.² .......................... G01J 1/36; G03B 7/08
[52] U.S. Cl. ...................................... 250/204; 354/25
[58] Field of Search .......................... 250/204; 354/25

[56] References Cited
U.S. PATENT DOCUMENTS

| | | | |
|---|---|---|---|
| 4,080,531 | 3/1978 | Stauffer | 250/204 |
| 4,085,320 | 4/1978 | Wilwerding | 250/204 X |

*Primary Examiner*—Palmer C. Demeo
*Attorney, Agent, or Firm*—McGlew and Tuttle

[57] ABSTRACT

An automatic focussing apparatus comprises a first drive element for repeatedly oscillating a movable reflecting mirror of an optical system of the range finder type, a second drive element for moving a focussing lens, a first signal generating component for producing a first signal when the amounts of light received by a stationary reflecting mirror and the movable reflecting mirror of the optical system are equal to each other, a second signal generating component for producing a second signal indicative of the position of the focussing lens, and a decision component for deciding the direction in which the focussing lens is to be moved in accordance with the relative timing of the first and the second signals.

7 Claims, 10 Drawing Figures

AUTOMATIC FOCUSSING APPARATUS

BACKGROUND OF THE INVENTION

This invention relates to an automatic focussing apparatus which may be conveniently used in an continuous photographing operation, as with a motor driven still camera or cine camera.

A variety of automatic focussing apparatuses have been proposed, and some of them are in actual use. The conventional apparatus takes a relatively long time to perform the focussing operation, and once a focussed position is determined, such position is maintained until the focussing operation is performed for the next time. This prevented their use in applications such as cine camera where the distance to an object photographed varies from time to time during the photographing process.

SUMMARY OF THE INVENTION

It is an object of the invention to achieve an automatic continuous focussing even with an object being photographed whose distance varies from time to time, thus making the automatic focussing applicable to a continuous photographing operation as with a cine camera.

It is another object of the invention to achieve an efficient focussing operation automatically by minimizing the time required therefor through the choice of a path of a minimum length from any position of the focussing lens.

In accordance with the invention, the automatic focussing apparatus comprises an optical system of the range finder type of a camera, first drive means for repeatedly rotating a movable reflecting mirror of the optical system, second drive means for moving a focussing lens, first signal generating means for producing a coincidence signal when the amounts of light received by a stationary reflecting mirror and by the movable reflecting mirror of the optical system are equal to each other, second signal generating means for producing a signal indicative of the position of the focussing lens, and means for deciding the direction in which the focussing lens is to be moved in accordance with the relative timing of the first and the second signals.

In accordance with the invention, a comparison is continuously made between the timing of the first signal or focussed signal and a second signal which indicates the position of the focussing lens so as to perform a constant modification of the lens position, thus enabling the focussing operation to be continuously controlled in response to an object being photographed the distance of which varies from time to time. In this manner, the automatic focussing apparatus is applicable to a continuous photographing operation as with a cine camera or motor driven still camera.

DESCRIPTION OF THE PREFERRED EMBODIMENTS

Figure 1:
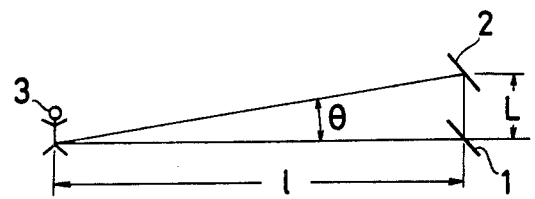
FIG. 1 is a schematic view illustrating the principle of the optical system of the invention.

FIG. 1 illustrates the principle of the optical system used in the present invention. The system includes a stationary reflecting mirror 1 and a movable reflecting mirror 2 which is disposed at a distance L from the mirror 1. The stationary mirror is located at a distance l from an object 3 being photographed. The reflecting mirror 2 is normally maintained in oscillation between a position corresponding to the minimum photographable position and another position corresponding to infinity. A focussing lens, not shown, is disposed for reciprocating movement, by a drive source such as a motor, across an extent defined between these positions, a position corresponding to the minimum photographable distance to an object being photographed and another position corresponding to infinity. The focussing requirement for the object 3 shown in FIG. 1 is represented as follows:

$$\theta = \tan^{-1}(L/l)$$

A first signal or focussed signal is produced at the moment when the above requirement is satisfied during the reciprocating movement of the movable reflecting mirror. A second signal or coincidence signal is produced when the distance to the object which is focussed by the lens is equal to the distance to the object for which the reflecting mirror satisfies the above focussing requirement. A decision is made whether the first signal precedes or lags behind the second signal, and the lens is moved either forwardly or rearwardly in accordance with such relative timing. When the focussing lens reaches a desired position, it may be stopped to complete the focussing operation. Preferably the detection signal is produced only during the forward movement or the rearward movement of the movable reflecting mirror 2 during its reciprocating movement in order to determine the direction in which the focussing lens is to be moved in a reliable manner.

Figure 2:
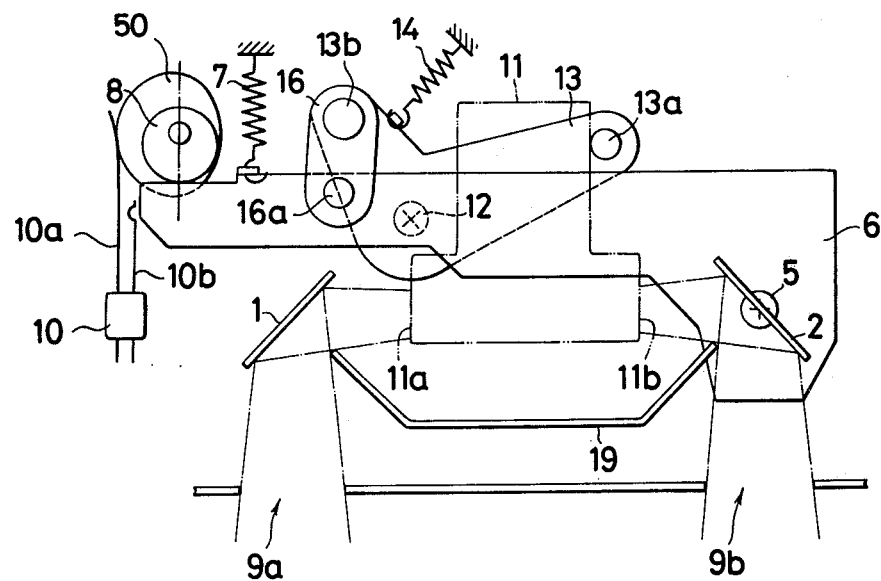
FIG. 2 is a plan view of one embodiment of the apparatus according to the invention.
Figure 3:
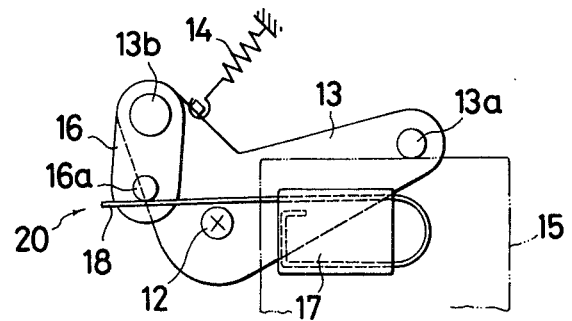
FIG. 3 is a plan view of part of the apparatus shown in FIG. 2.
Figure 4:
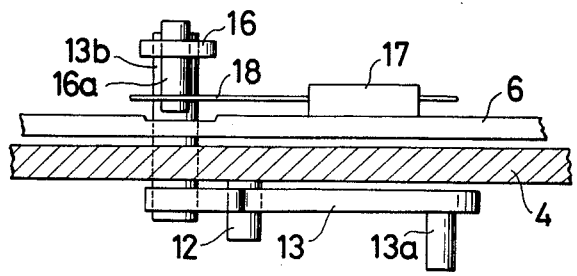
FIG. 4 is a front view, partly in section, of the parts shown in FIG. 3.

One example of means for deriving the first and the second signals is illustrated in FIGS. 2 to 4. Referring to these Figures, there is shown a base plate 4 on which a lever 6 is pivotally mounted on a pin 5 and is urged by a tension spring 7 to rotate clockwise, as viewed in FIG. 2. However, the resulting rotation is blocked by the abutment of its one lateral edge, located adjacent the free end thereof, against an active surface of an eccentric cam 8, which is normally driven for rotation by a motor, not shown. A movable reflecting mirror 2 is fixedly mounted on the lever 6 and has a reflecting surface which includes the axis of the pin 5 and which is secured in a position to deflect light incident through a window slot 9b to the left, in a direction substantially at right angles to the direction of incidence. Another cam 50 is fixedly mounted on the same rotary shaft as the eccentric cam 8 and has a larger diameter around one-half of its perimeter and a reduced diameter around the remainder of the periphery. The relative position of the cams 8 and 50 is such that the parting line between the larger and the reduced diameter portions of the cam 50 is aligned with a line joining the periphelion and the aphelion of the cam 8.

A mode changeover switch 10 is fixedly mounted on the base plate 4, and includes a movable contact 10a which is normally urged against the active surface of the cam 50 and which is removed from a stationary contact 10b under the condition shown in FIG. 2 since the lever 6 bears against the large diameter portion of the cam 8 and the movable contact 10a bears against the large diameter portion of the cam 50. A stationary reflecting mirror 1 is disposed on the base plate 4 in a manner symmetrical with respect to the movable reflecting mirror 2 so as to deflect light incident thereon through a window slot 9a, through 90° to the right. The light which is reflected by the reflecting mirrors 1, 2 impinges upon light receiving surfaces 11a, 11b of light comparisons means 11 which is interposed between them. The light comparison means 11 comprises a pair of light receiving elements disposed in the respective light receiving surfaces 11a, 11b, and an electrical comparison circuit which produces a coincidence signal when the output from the respective elements is equal to each other or when the focussing requirement previously mentioned in connection with FIG. 1 is satisfied. Such comparison circuit may comprise any conventional circuit arrangement as is heretofore used in usual automatic focussing apparatus or exposure meter circuits. It is to be noted that a light shield 19 is disposed in front of the light comparison means 11.

A bell crank 13 is pivotally mounted on a stud 12 which is secured to the underside of the base plate 4, and is urged to rotate clockwise, as viewed in FIGS. 2 and 3, by a tension spring 14. However, the resulting rotation is prevented by the abutment of a downwardly depending pin 13a fixedly mounted on the right-hand end of the crank against the end of a focussing lens ring 15 (see FIG. 3) disposed in the taking lens barrel. It is to be noted that the focussing lens 15 is adapted to move in a vertical direction, as viewed in FIG. 3. Another pin 13b is fixedly mounted on the left-hand end of the bell crank 13, and extends upwardly through the base plate 4 to a position above the lever 6, with its top end fixedly carrying a tongue 16. A dowardly extending pin 16a is fixedly mounted on the free end of the tongue 16 (extending in a direction toward the back of the drawing as viewed in FIGS. 2 and 3), and is located laterally adjacent a switch blade 18 which is secured to the lever 6 by means of an electrically insulating block 17. In the position shown in FIG. 3, the pin 16a is engaged by the switch blade 18. The pin 16a and the blade 18 form together a detection switch 20 which serves detecting the position of the focussing lens. They move toward or away from each other depending on the relationship between the position of the focussing ring and the angular position of the lever 6. It is to be understood that the dimensions of the lever 6 and the bell crank 13 are chosen such that the distance to an object being photographed as it is determined by the reflecting mirrors 1, 2 coincides with the focussed position of the taking lens at the moment when the switch 20 becomes closed or open.

When the eccentric cam 8 is set in continuous rotation by a drive from the motor, the lever 6 and the movable reflecting mirror 2 which is integral therewith angularly move in an oscillatory manner about the pin 5 to change the incidence of light onto the light receiving surface 11b as reflected by the mirror 2, from time to time, in contrast to a fixed light incidence onto the light receiving surface 11a achieved by reflection by the stationary reflecting mirror 1. During one cycle of variation of the light incidence to the light receiving surface 11b, the focussing requirement mentioned in connnection with FIG. 1 is satisfied at two locations, where the aforementioned first signal is produced. During the rotation of the cam 50 through one-half revolution or during one-half cycle of the oscillatory angular movement of the lever 6, the movable contact 10a engages the stationary contact 10b, while it remains removed from the latter during the remaining one-half cycle. On the other hand, the detection switch 20 formed by the pin 16a and the blade 18 switches twice during the oscillatory angular movement of the lever 6 depending on the relative position of the focussing ring 15 and the lever 6, thereby producing the aforementioned second signal.

Figure 5:
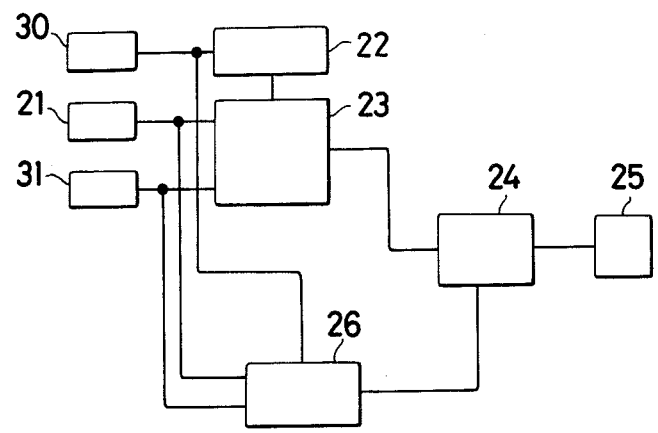
FIG. 5 is a block diagram of an electrical processing system used in the apparatus of the invention.

It will be seen that some control means must be provided to bring the second signal into time coincidence with the first signal by moving the focussing ring 15 in order to achieve an automatic focussing operation in response to such electrical signals. One example of such control means is shown in block form in FIG. 5. Referring to FIG. 5, there is shown sources 30, 31 which supply a mode switching signal and a focussing lens position signal, as may be produced by the mode changeover switch 10 and the detection switch 20, respectively, and a focussed signal or the first signal is supplied by another source 21. All of these sources feed a mode decision block 22 and a direction decision block 26. In addition, the sources 21, 31 also feed a comparison circuit 23, which in turn feeds a motor control block 24 connected to control a motor 25. It is to be understood that the motor 25 is ganged with the focussing ring 15 to move the latter in accordance with the drive from the motor. It should be noted that the motor 25 is separate from a motor which is utilized for reciprocatorily causing an angular movement of the lever 6.

Assuming that the drive motor associated with the cams 8 and 50 is energized in response to a shutter release operation of the camera, for example, to cause an oscillatory angular movement of the lever 6, which takes place in the manner mentioned above in connection with FIGS. 2 to 4, the switch 10 is repeatedly operated, and the focussed signal 21 is produced twice during one cycle of the oscillatory motion of the lever 6. Similarly, the detection switch 20 produces the second signal 31. The mode decision circuit 22 may be composed of a flipflop circuit or the like which enables the comparison circuit 23 only when the switch 10 is either opened or closed. The function of the mode decision block 22 will be understood by considering a confusion which will occur in the comparison circuit 23 when it compares the focussing lens position signal 31 against the focussed signal 21 which is produced twice during one cycle of the reciprocatory motion of the lever 6. In this manner, the mode decision block 22 chooses either occurrence of the focussed signal 21 which may be used in the comparison circuit 23 to determine the relative timing of the focussed signal and the focussing lens position signal 31. Whenever there is a time difference in the occurrence of these signals, a signal is fed to the motor control 24. The direction decision block 26 determines the relative timing of the signals 21, 31 in order to determine the direction of rotation of the motor 25. The motor is driven by the motor control circuit 24 until the timing of occurrence of the signal 31, associated with the movement of the focussing ring 15 which is driven by the motor 25, becomes coincident with the occurrence of the signal 21. Thereupon, the comparison circuit 23 ceases to provide an output signal, whereby the motor 25 is no longer driven by the control circuit 24, interrupting the movement of the focussing ring 15. This completes an automatic focussing operation. It will be noted that the oscillatory angular movement of the movable reflecting mirror 2 may be performed intermittently at a suitable interval.

Figure 6:
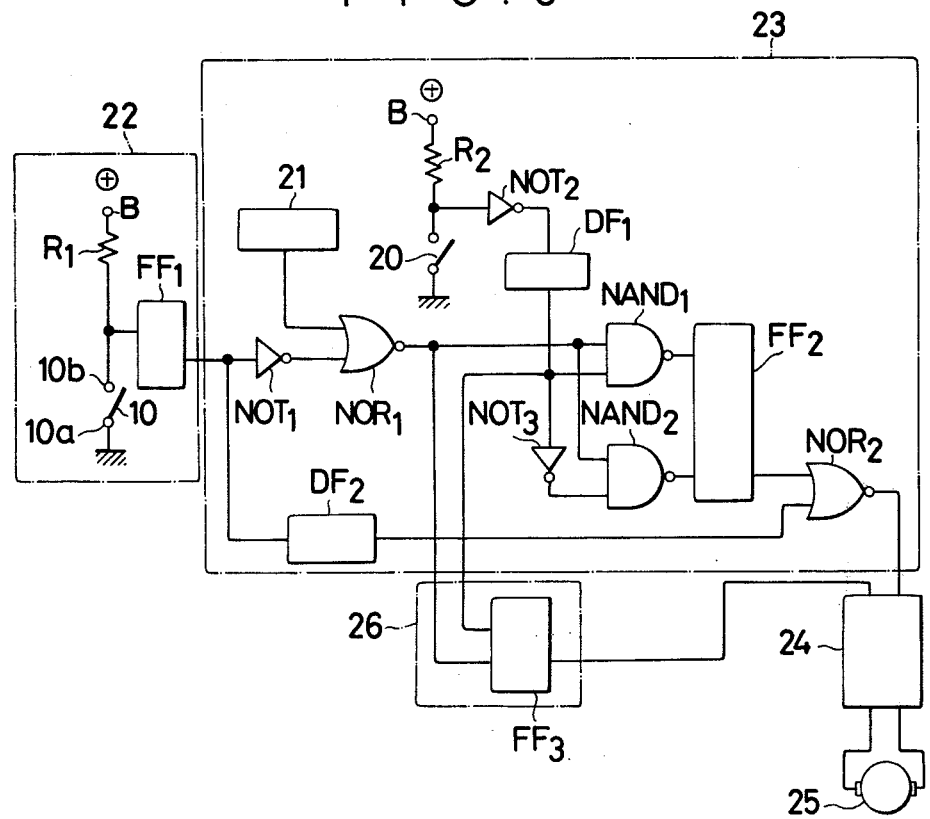
FIG. 6 is a detailed circuit diagram of the electrical system.

FIG. 6 shows a more specific circuit of the arrangement shown in block diagram in FIG. 5. In FIG. 6, the major blocks of FIG. 5 are indicated by phantom lines designated by corresponding numerals. The mode decision block 22 includes a resistor R1 having its one end connected with a power source B and its other end connected with the contact 10b of the switch 10, the other contact 10a of which is connected with the ground. The block 22 also includes a flipflop FF1 having its input terminal connected with the contact 10b.

The comparison circuit 23 includes a NOR circuit NOR1 which receives a focussed signal from the source 21 and the output of the flipflop FF1 through a NOT circuit NOT1. The output of NOR1 is fed to one input of NAND circuit NAND1, the other input of which is connected with the output of a differentiator DF1 which is fed from the source B through resistor R2 and NOT circuit NOT2, the differentiator providing an output whenever the switch 20 is either closed or opened. The differentiator also feeds one input of a second NAND circuit NAND2 through NOT circuit NOT3, and the other input of NAND2 is connected with the output of NOR1. The output signals of both NAND1 and NAND2 are connected with the set and reset inputs, respectively, of a flipflop circuit FF2, the output signal of which is connected with one input of NOR circuit NOR2. NOR circuit NOR2 receives another input from another differentiator DF2 which receives the output signal of the flipflop FF1. The direction decision block 26 comprises a flipflop FF3 which receives the output of the differentiator DF1 and the output signal of NOR1 at its set and reset inputs, respectively. The output signal of the flipflop FF3 is fed to one input of the motor control 24, which also receives the output signal of NOR2. The motor 25 is connected across the output terminals of the control 24 and serves, when energized, to move the focussing ring 15 shown in FIG. 3.

Figure 7:
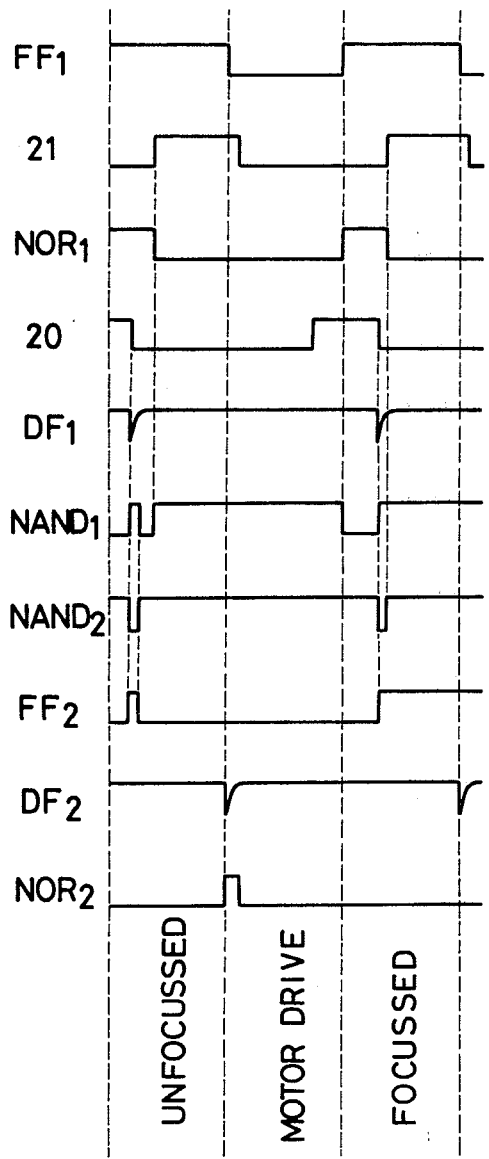
FIG. 7 is a timing chart illustrating the operation of the electrical system.
Figure 7:
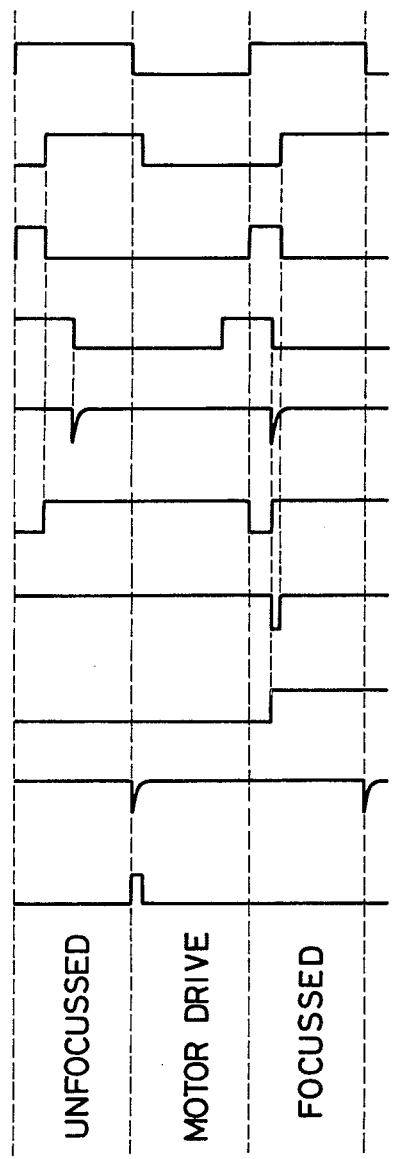

The operation of the above circuit will be described with reference to the timing chart shown in FIG. 7. As mentioned previously in connection with FIG. 2, the switch 10 is repeatedly opened or closed as the lever 6 angularly moves in an oscillatory manner, so that the output of flipflop FF1 periodically changes between a positive and a negative value. The focussed signal 21 will occur once for one cycle of operation of the lever 6 or for one cycle of operation of the flipflip FF1, but the relative timing or phase of the focussed signal 21 relative to the output signal of the flipflop FF1 will depend on the distance to an object being photographed. The switch 20 is opened and closed for each cycle of operation of the flipflop FF1, but the timing at which it is either opened or closed will also depend on the initial position of the focussing ring 15. As a consequence, the timing when the switch 20 is operated may be either leading or lagging behind the occurrence of the focussed signal 21. FIG. 7 (1) shows an instance in which the switch 20 is operated earlier than the focussed signal 21 while FIG. 7 (2) shows the opposite case. Considering the instance shown in FIG. 7 (1), it will be seen that NOR1 produces a positive output signal only when the flipflop FF1 produces a positive output and the focussed signal 21 is negative. At other times, it produces a negative output. The output of NAND1 will be turned to the positive polarity by the focussing lens position signal or the actuation signal of the switch 20 which precedes the focussed signal 21, but since the signal from the switch 20 is differentiated by the differentiator DF1, NAND1 immediately reverts to the positive polarity, and thereafter is turned to the positive polarity again in response to the focussed signal 21. By contrast, because NOT3 is inserted in the input circuit to NAND2, the output of the latter will be negative only when NOR1 produces a positive output and the differentiator DF1 produces a negative output. At other times, the output of NAND2 will be positive. The flipflop FF2 will be triggered to produce the positive output in response to the positive input from NAND1, but is immediately turned to the negative polarity in response to the positive input from NAND2. During the time the output from the flipflop FF2 is negative, the signal from the flipflop FF1 is differentiated by the differenctiator DF2 and is applied to NOR2, which therefore produces a positive output of a short duration. The motor 25 is driven for rotation by the motor control 24 when NOR2 produces a positive output, and the direction of rotation of the motor is determined by the polarity of the output from the flipflop FF3. The polarity of the output from the flipflop FF3 is determined by the relative timing of the focussed signal 21 and the focussing lens position signal provided by the switch 20, and the arrangement is such that the motor 25 is driven in a direction to minimize or eliminate the phase difference between these signals. When the phase difference between these signals is eliminated or reduced within a given range of tolerance, the output of the flipflop FF2 will be turned to the positive polarity in which it is maintained, as shown in the right-hand part of FIG. 7 (1), so that any subsequent output signal from the differentiator DF2 cannot cause NOR2 to produce a positive output, thereby preventing a further energization of the motor 25 and completing an automatic focussing operation.

In the situation illustrated in FIG. 7 (2) where the focussing lens position signal produced by the switch 20 is lagging behind the focussed signal 21, NOR2 will produce a positive output to drive the motor 25 when the differentiator DF2 produces a signal during the time the flipflop FF2 provides a negative output. However, it should be noted that since the flipflop FF3 produces an output of the opposite polarity from that mentioned above, the motor 25 will be driven in the opposite direction. When the focussing lens reaches a position in which it is focussed with respect to an object being photographed, as evidenced by the coincident occurrence of the signals 21, 31, the flipflop FF2 is switched to interrupt the drive of the motor, thus completing an automatic focussing operation.

Figure 8:
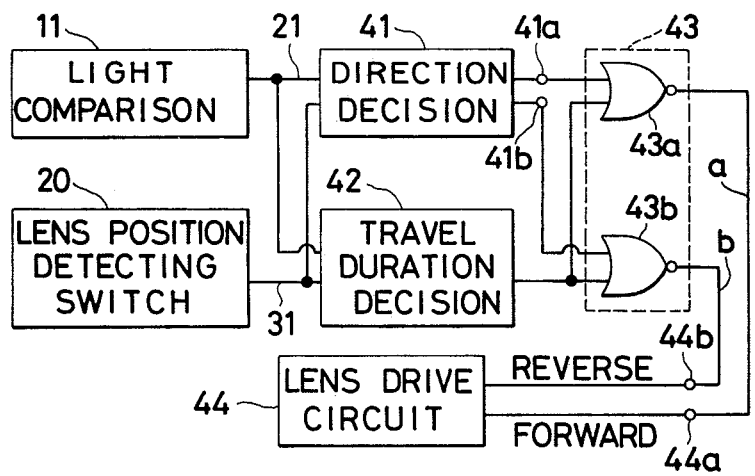
FIG. 8 is a block diagram of another form of electrical system which may be used in the apparatus of the invention.

Referring to FIG. 8, another embodiment of the electrical control means will be described,. As before, the light comparison circuit 11 is effective to produce a focussed signal 21, and the detection switch 20 produces a focussing lens position signal 31. The signals from these components are fed to both a direction decision block 41 and a travel duration decision block 42. The direction decision block 41 may include a flipflop, for example, an input terminal of which may be connected with the aforementioned mode changeover switch 10 so that it becomes capable of receiving the focussed signal 21 and the lens position signal 31 only during the foward or reverse movement of the lever 6. The direction decision block 41 may be constructed such that a negative output signal is produced at a first output terminal 41a thereof when the occurrence of the focussed signal leads the lens position signal, and is produced at a second output terminal 41b when the focussed signal lags behind the lens position signal, and a positive signal will be produced on both of the terminals 41a, 41b when the signals occur coincidently in time. The first output terminal 41a of the direction decision block 41 is connected with one input of NOR circuit 43a which is contained in the mixer 43, while the second output terminal 41b is connected to one input of another NOR circuit 43b also contained within the mixer 43. The travel duration decision block 42 is adapted to detect the magnitude of a time difference between the occurrence of the focussed signal 21 and the lens position signal 31 and to produce a negative pulse having a pulse width which corresponds to the time difference. The output terminal of the travel duration decision block 42 is connected with the other inputs of the NOR circuits 43a, 43b. The output terminal of NOR circuit 43a is connected with a forward control input 44a while the output terminal of NOR circuit 43b is connected with a reverse control input 44b, of a focussing lens drive circuit 44.

Figure 9:
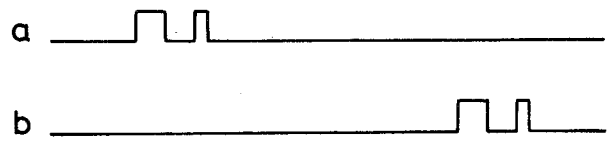
FIG. 9 is a timing chart illustrating the operation of the electrical system shown in FIG. 8.

When the lever 6 is driven for oscillatory angular movement as mentioned previously in connection with FIGS. 2 to 4, the switch 10 is repeatedly operated, and the focussed signal 21 is produced twice during one cycle of the oscillatory motion of the lever 6. Similarly, the switch 20 produces the focussing lens position signal 31. The direction decision block 41 receives both signals 21, 31 only when the mode changeover switch 10 is closed or when the switch 10 is opened, and determines the relative timing of these signal. Assuming that the focussed signal occurs earlier than the lens position signal, a negative signal will be produced at the output terminal 41a of the block 41, and the block 42 will produce a pulse signal having a pulse width which corresponds to the time difference between the occurrence of both signals. Thus, NOR circuit 43a will produce a positive signal as indicated in FIG. 9a which is symmetrical with respect to the signal from the block 42 while NOR circuit 43b produces an output. The output from NOR circuit 43a is applied to positive control input 44a of the lens drive circuit 44, whereby it drives the focussing lens 15 in the forward direction. Since the focussed signal 21 and the lens position signal 31 are produced intermittently as the lever 6 angularly moves in an oscillatory manner, the drive imparted to the focussing lens from the drive circuit will occur for each occurrence of the signals 21, 31 until the focussing lens 15 reaches a focussed position with respect to an object being photographed. Under the focussed condition, both of signals 21, 31 occur coincidently in time, so that the blocks 41, 42 and the mixer 43 produce no output, interrupting the operation of lens drive circuit 44 to complete an automatic focussing operation. It will be noted in FIG. 9a that successive versions of the forward control signal from NOR circuit 43a will have a decreasing pulse width as the focussing operation proceeds.

Depnding on the location or movement of an object being photographed, the focussed signal 21 may lag behind the lens position signal. In this case, the other output terminal 41b of the direction decision block 41 will produce a negative signal, so that NOR circuit 43b will produce a positive signal as shown in FIG. 9b which is symmetrical to the signal from the blcok 42. This output signal is applied to the reverse control input 44b of the lens drive circuit 44, which therefore moves the focussing lens 15 in the opposite or reverse direction until the lens reaches a focussed position.

It will be appreciated that while the control circuit shown in FIGS. 5 and 6 produces pulse signals of a constant width until the focussing operation is completed, the control circuit shown in FIG. 8 produces control signals of a reducing width as the focussing operation proceeds, so that the control circuit of FIG. 8 is preferred in that a more rapid and accurate focussing operation can be achieved.

What is claimed is:

1. In an automatic focussing apparatus including a stationary reflecting mirror and a movable reflecting mirror which are disposed behind respective light entry windows and which reflect entering light to respective light receiving surfaces for comparison of the amount of light received by the respective surfaces for movement of a focussing lens to perform an automatic focussing operation responsive to such comparison; the apparatus comprising first drive means operable to repeatedly effect an angular movement of said movable reflecting mirror; second drive means operable to move said focussing lens; means producing a first signal when the amount of light received from said movable reflecting mirror is equal to that received from said stationary reflecting mirror; means producing a second signal indicative of the position of said focussing lens; and control means operable to determine the direction in which the focussing lens is to be moved in accordance with the relative timing of the occurrence of the first signal and the second signal; said means producing the second signal comrpises a member movable as a unit with said movable reflecting mirror, and another member mounted for movement as a unit with said focussing lens, said members conjointly forming a switch.

2. An automatic focussing apparatus according to claim 1 in which at least one contact of said switch comprises a resilient blade adapted to engage the other contact.

3. An automatic focussing apparatus according to claim 1 in which said movable reflecting mirror is adapted for repeated angular movement in response to a release operation.

4. An automatic focussing apparatus according to claim 1 in which said movable reflecting mirror is adapted for repeated angular movement selectively in either a continuous manner or an intermittent manner.

5. In an automatic focussing apparatus including a stationary reflecting mirror and a movable reflecting mirror which are disposed behind respective light entry windows and which reflect entering light to respective light receiving surfaces for comparison of the amount of light received by the respective surfaces for movement of a focussing lens to perform an automatic focussing operation responsive to such comparison; the apparatus comprising first drive means operable to repeatedly effect an angular movement of said movable reflecting mirror; second drive means operable to move said focussing lens; means producing a first signal when the amount of light received from said movable reflecting mirror is equal to that received from said stationary reflecting mirror; means producing a second signal indicative of the position of said focussing lens; and control means operable to determine the direction in which the focussing lens is to be moved in accordance with the relative timing of the occurrence of the first signal and the second signal; a mode changeover means associated with said first drive means and connected to said second drive means for controlling the direction of movement of said focussing lens, said mode changeover means responsive during a portion of said angular movement of said moveable reflecting mirror to move said focussing lens in one direction and responsive through a remaining portion of said angular movement of said moveable reflecting mirror to move said focussing lens in an opposite direction.

6. An automatic focussing apparatus according to claim 5 in which the first and the second signal are utilized only during the movement of the movable reflecting mirror in one direction.

7. An automatic focussing apparatus according to claim 5 in which the control means for determining the direction in which the focussing lens is to be moved comprises a flipflop which is operative to determine the direction.

* * * * *